April 3, 1962　　　　　M. WYLIE　　　　　3,028,030
LOAD HAUL AND UNLOAD TRAILER

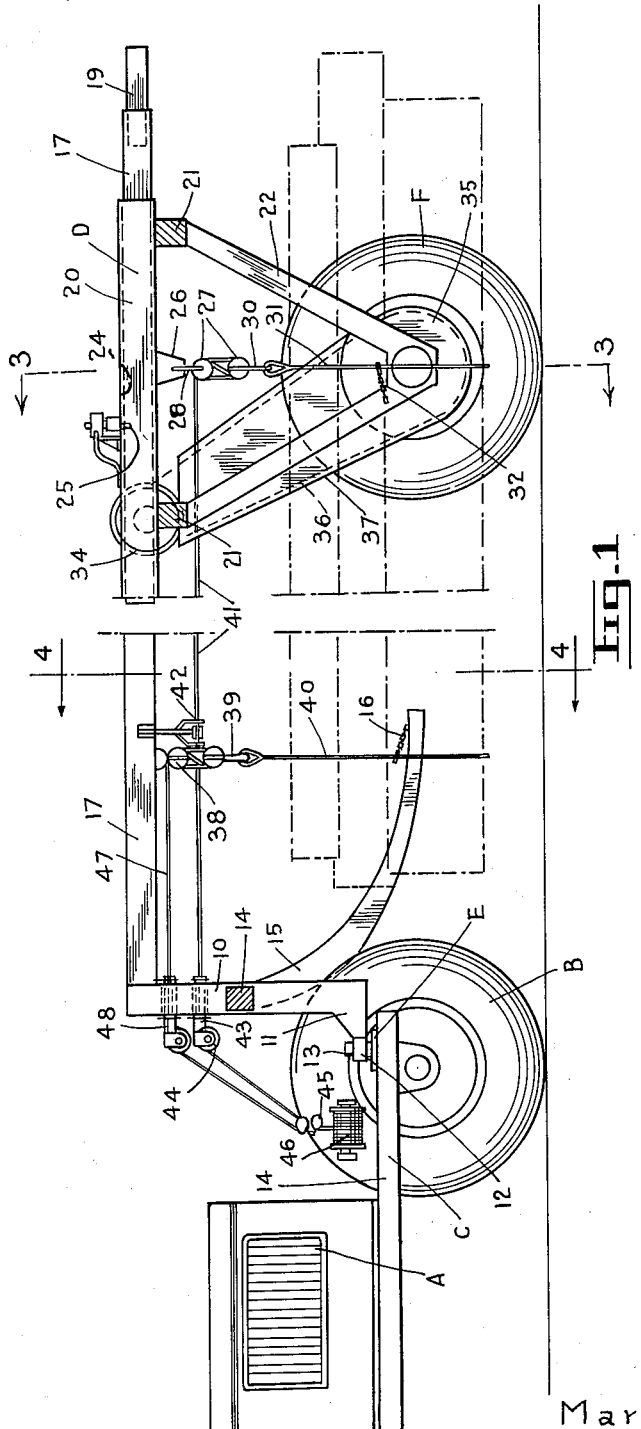

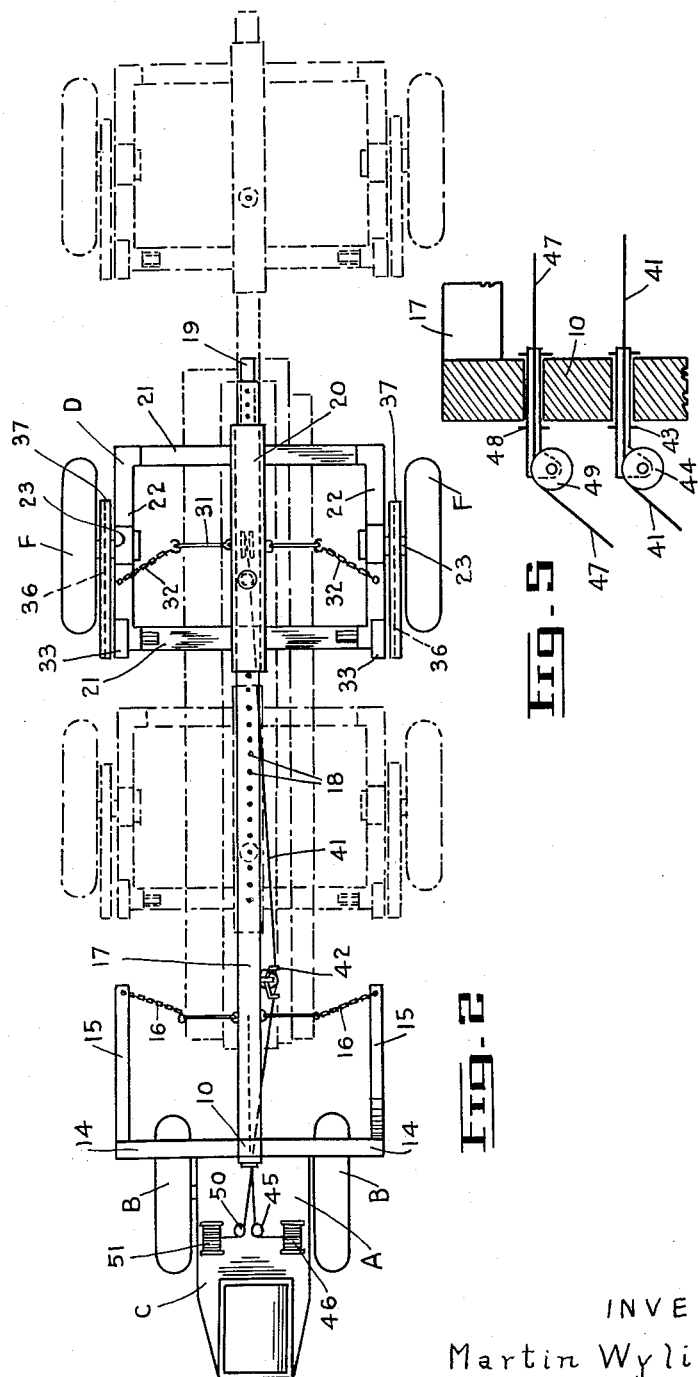

Filed June 25, 1959　　　　　　　　　　3 Sheets-Sheet 3

INVENTOR
Martin Wylie
Ralph Burch
Attorney 3,028,030
LOAD HAUL AND UNLOAD TRAILER
Martin Wylie, R.R. 2, Courtney, British
Columbia, Canada
Filed June 25, 1959, Ser. No. 822,783
4 Claims. (Cl. 214—396)

My invention relates to trailers adapted to be hitched to a tractor and utilized in conveying lumber from one place to another.

I am aware that sulkies for conveying dressed lumber and also logging carts, have been used, but the utility of these devices have been limited to their particular operational functions in timber yards and/or logging operations, for which they are specifically designed.

For simplicity of construction I use a conventional tractor and a conventional hitch whereby my improved trailer may be operatively connected to the tractor, but the trailer is so designed that it is capable of being used on all types of roads including roads or tracks on the location of lumbering operations.

Moreover my trailer is adjustable lengthwise to accommodate varying lengths of logs which are to be conveyed from the place at which they were felled or cut, to another place or location, from which the logs may be dispatched to saw mills or other locii at which they are to be used.

This adjustability also contributes to the adaptability of maneuvering the trailer particularly when the trailer reach has been shortened, since acute or sharp turns can be more easily negotiated by the steering of the tractor.

When using my invention a plurality of logs of approximately equal length but of varying diameters are bound or huddled into compact cylindrical formation and are held in this position by encircling slings or chains, and such compact arrangement of logs are of a width which will lie within the lateral confines of the trailer to be used in the transportation of the logs.

By this arrangement of assembling the logs, my trailer may be backed longitudinally into a desired position over the logs and straddle the logs, and then the logs are lifted or suspended within the confines of the trailer, and by this unique arrangement no additional external loading equipment is required.

These compact bundles of huddled logs are so secured when in elevated or lifted position that lateral swaying of the load cannot take place, and since the centre of gravity of the loaded trailer is low and lies within the base of the trailer, then the stability of the trailer is assured.

Moreover my trailer is of rugged construction and will perform all the functions required of it, and all the structural parts of the trailer are easily accessible for inspection or repair.

There are many other advantages which my improved trailer possesses, and these will be described as the specification develops.

So that the nature of my invention will be clearly understood, I have illustrated an embodiment of the same which I shall describe in detail, but I wish it to be understood that I do not limit my invention to this specific structure but reserve the right to modify the same within the scope of my appended claims.

In the drawings:

FIGURE 1 is a side elevation of my improved trailer as seen when hitched to a conventional tractor, part of the trailer being in section.

FIGURE 2 is a plan view of my improved trailer hitched to a conventional tractor, and showing in stippled lines the trailer in adjusted positions to suit the load being carried by the trailer.

FIGURE 5 is a sectional elevation of the upper portion of the tow post showing the location of the sleeves providing self aligning fairleads for the hoisting and lowering cables.

Like characters of reference refer to like parts in the several figures of the drawings.

Figure 4:
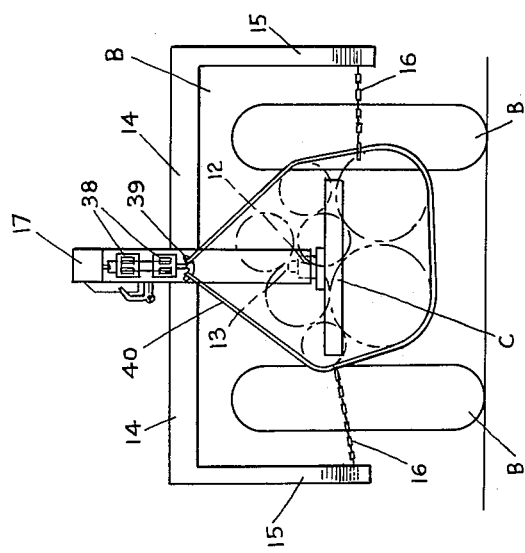
FIGURE 4 is a transverse section on the line 4—4 of FIGURE 1 as seen when looking in the direction of the arrows.
Figure 3:
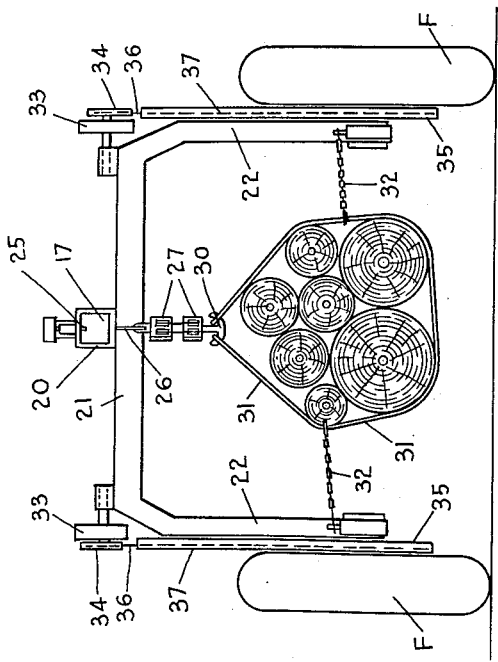
FIGURE 3 is a transverse section taken on the line 3—3 of FIGURE 1 and looking in the direction of the arrows.

Referring to the drawings, A represents a tractor provided with traction wheels B suitably journalled on the tractor frame C, and this tractor is of conventional type and need not be further described. My improved trailer D is connected to the tractor A by a conventional hitch E.

The trailer D is provided on its front end with a vertically disposed towing post 10 which is formed at its lower end with an offset forwardly projecting arm 11 preferably formed integral with the post, and this arm is provided with a vertically disposed hub 12 which makes pivotal engagement with the vertically disposed king pin 13, the lower end of which is rigidly secured to the frame C of the tractor A.

The towing post 10 is provided intermediate of its height with a pair of laterally extending arms 14 which are in alignment, and the adjacent ends of these arms are formed integral with the post 10 or are otherwise rigidly secured thereto as by welding. The outer ends of the arms 14 are formed with downwardly and rearwardly disposed arcuate stabilizing arms 15 which are arranged in parallel with each other, and the free ends of these arms carry anchoring chains 16, the object of which will be made clear hereafter.

Extending rearwardly from the upper end of the towing post 10 is a horizontally disposed reach 17 which may be solid or tubular if desired, and this reach is substantially square or rectangular in cross section, and one end of the reach is rigidly secured to the towing post 10. The reach is provided on its upper wall and for the major portion of its length with a plurality of vertically disposed equidistantly spaced orifices 18.

The length of the reach 17 may be extended to support logs of greater length by adding a removable section of the reach which is fitted over a stud shaft 19. By making the reach 17 of tubular construction the removable section may be telescopically fitted in the reach and the stud shaft 19 eliminated.

Slidably mounted on the reach 17 is a tubular square or rectangular case or sleeve 20 which constitutes an adjustable carrier, and across the lower face of this case or sleeve, a pair of transversely disposed parallel arms 21 extend, and these arms are rigidly attached to the case or sleeve at their median points, as by electric welding, and these arms extend equally on both sides of the case or sleeve.

Depending from the ends of the arms 21, and integrally connected thereto, or electrically welded thereto, are a pair of V-shaped brackets 22 which are in parallel relation to each other, with the apices downwardly disposed, and to these apices are rigidly connected stub axles 23, which extend beyond the outer face of the brackets. On the outer ends of the stud axles 23 the ground wheels F are rotatably mounted.

The case or sleeve 20 is provided on its upper wall or face with an orifice 24, with which the pneumatically actuated pin 25 slidably engages, and this pin is designed to engage with a registering orifice 18 in the reach 17, thereby holding the case or sleeve 20 in a desired selective position on the reach. It will thus be clear that the trailer is adjustable on the reach, and this is necessary to permit logs of varying length being effectively slung in a secure stable manner within the trailer, from the under face of the case or sleeve 20. Depending from the under face of the case or sleeve 20 and intermediate of the length thereof, is a bracket 26, from which a block 27 is suspended by the link 28, and this block is provided with a depending double hook 30 designed to be engaged by the ends of the sling 31 which encircles or embraces a bundle of logs.

Anchoring chains 32 are provided, with one end of each chain detachably connected to an adjoining V-bracket 22, while the other end of the chain is attached to the sling 31.

An air brake drum 33 is provided for each of the ground wheels F being mounted on the arms 21 above the wheels with each rotatable member of the brake drum being connected to a ground wheel by a sprocket chain 36 trained around a sprocket wheel 34 connected to the rotatable member of the brake drum and a sprocket wheel 35 mounted on the stub axle 23 of the ground wheel. The chain and sprocket wheels are enclosed in an oil tight guard 37. Upon actuation of the brake drum the ground wheels are held against rotation by the sprocket chain connection between the rotatable brake drum member and the ground wheel. By mounting the brake drums above the ground wheels they are protected from mud and water.

From the lower face of the reach 17 and at a point adjacent the towing post 10, a block 38 is suspended, and this block is provided with a depending double hook 39 with which the ends of the sling 40 engage.

The anchor chains 16 which are attached at one end to the stabilizing arms 15 have their other ends attached to the slings 40 which encircle the bundle of logs being transported by the trailer.

A hoisting cable 41 is operatively attached at one end to the block 27, and this cable passes through a self adjusting fairlead or guide 42 which is suspended from the reach 17, and the cable passes through a self adjusting fairlead 43 provided on the towing post 10, and the free end of the cable passes around guide pulleys 44 and 45 and is coiled on a drum 46 mounted on the tractor frame and operated in a suitable manner by the prime mover of the tractor A.

A second hoisting cable 47 is operatively attached at one end to the block 38, and the free end of the cable passes through the self-adjusting fairlead 48 carried by the towing post 10, and the free end of this cable passes over the guide pulleys 49 and 50 and coiled around the hoisting drum 51 which is mounted on the tractor frame C and operated by the prime mover of the tractor A.

When my logging trailer is in use, then the logs to be transported are arranged in huddled bundles which are embraced by the slings 31 and 40, and the eyelets on the ends of the slings are engaged with the appropriate double hooks 30 and 39 respectively.

To elevate the huddled bundles of logs into a desired suspended position below the case or sleeve 20 and reach 17, then the hoisting cables 41 and 47 are coiled on their respective drums 46 and 51, so hoisting the logs into suspended position above the ground surface, and in this position the logs will lie laterally within the confines of the trailer but may extend longitudinally beyond the trailer.

In the elevated position the anchoring chains 32 and 16 are adjusted so that they are in tension with respect to the slings encircling the bundles of logs, so that the bundle of logs is held centrally aligned within and laterally embraced by the trailer D. In this position the logs cannot be displaced laterally, and moreover they cannot sway, so that the stability of the trailer is assured. The trailer is now ready to be towed to the location to which the logs are to be delivered.

It is not necessary to describe in detail the dumping of the logs as this is accomplished by reversing the rotation of the drums 46 and 51 to unwind the cables 41 and 47 and so lower the bundle of logs. The dumping is consequently a reversal of the loading operation.

It will be clear that the towing post 10 can be rotated on the hitch E, so that the reach 17 and the case or sleeve 20 will always lie in an approximate horizontal position, that is depending on the contour and undulations of the road surface over which the trailer is passing, and since the bundles of logs are suspended in the manner previously described, the trailer is at all times in a stable position.

As stated previously, the trailer may be adjusted longitudinally on the reach 17, and the position of the trailer relatively to the towing post will be governed by the lengths of the bundles of logs being transported, but in all cases the centre of gravity of each bundle of logs will lie in advance of the trailer, so imparting a stable longitudinal suspension of the logs.

My trailer is formed of suitable metallic parts which are assembled in such a manner that the trailer will withstand the normal rugged use to which a trailer is subjected, and the trailer may be backed into the banks of a river to liberate the logs into the river so that they may be floated down to the point at which they are destined to be delivered.

It will be readily understood that the adjustment of the trailer longitudinally on the reach, permits of the best control for manoeuvring the trailer consistent with the length of the bundle of logs being conveyed.

I claim:

1. A log carrying trailer comprising an upright towing post adapted to be hitched to a tractor, arms extending laterally from said post, arcuate stabilizing arms extending downwardly and rearwardly, a reach bar extending rearwardly from the upper end of said post above said arms, a wheeled frame supporting the outer end of said reach bar and slidably mounted thereon for movement longitudinally of the bar, means for securing said wheeled frame in adjusted position on said reach bar, a hoisting block suspended from said reach bar above said stabilizing arms, a sling suspended from said block, anchor chains connecting said sling to said stabilizing arms, a second hoisting block suspended from said wheeled frame, a slug suspended from said second hoisting block, anchor chains connecting said last-mentioned sling to said wheeled frame, and cables connected with said hoisting blocks for raising and lowering said slings.

2. A log carrying trailer as described in claim 1 including brake drums mounted on said wheeled frame above the wheels, and a chain and sprocket drive between said brake drums and said wheels.

3. A log carrying trailer for attachment to a tractor comprising an upright post pivotally mounted on the tractor frame, opposed arms extending laterally from said post intermediate its length, arcuate stabilizer arms extending downwardly and rearwardly from the outer ends of said lateral arms, a horizontal reach extending rearwardly from the upper end of said post, a sleeve slidably mounted on said reach for longitudinal movement thereon, means for securing said sleeve in adjusted position, a pair of parallel arms extending transversely of said sleeve in spaced apart relation, said arms extending laterally from opposite sides of said sleeve, V-shaped brackets depending from the outer ends of said parallel arms, wheels mounted at the apices of said brackets, a sling suspended from said sleeve for suspending one end of the logs between said wheels, and a second sling suspended from said reach for suspending the other end of the logs between said arcuate stabilizer arms.

4. A log carrying trailer of the character described in claim 3 including brake drums mounted on the ends of one of the pair of parallel arms and a chain and sprocket drive connecting said brake drums to said wheels.

References Cited in the file of this patent
UNITED STATES PATENTS

| | | |
|---|---|---|
| 2,427,667 | Gilbert | Sept. 23, 1947 |
| 2,509,067 | Leach | May 23, 1950 |
| 2,572,636 | LeTourneau | Oct. 23, 1951 |
| 2,773,606 | Shepherd | Dec. 11, 1956 |